United States Patent
Komura et al.

(12)
(10) Patent No.: US 6,414,052 B1
(45) Date of Patent: Jul. 2, 2002

(54) POLYMERIC PARTICLES AND PRODUCTION METHOD THEREOF

(75) Inventors: Akinori Komura; Ryojiro Akashi; Takashi Uematsu; Jun Kawahara; Masahiro Moriyama, all of Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/722,724

(22) Filed: Nov. 28, 2000

(30) Foreign Application Priority Data

Jan. 18, 2000 (JP) .......................... 2000-009497

(51) Int. Cl.$^7$ .............................. C08F 2/04; C08F 2/10; C08K 9/04; C08K 9/10
(52) U.S. Cl. .................. 523/215; 523/201; 523/202; 523/205; 526/89; 430/114; 528/490
(58) Field of Search ................. 523/201, 202, 523/205, 215; 563/89

(56) References Cited

U.S. PATENT DOCUMENTS

| | | | |
|---|---|---|---|
| 4,427,836 A | * | 1/1984 | Kowalski et al. |
| 5,843,613 A | * | 12/1998 | Fujiwara et al. |
| 5,852,073 A | * | 12/1998 | Villiger et al. |
| 6,040,380 A | * | 3/2000 | Dunaway et al. |
| 6,258,887 B1 | * | 7/2001 | Bardman et al. |

FOREIGN PATENT DOCUMENTS

| | | |
|---|---|---|
| JP | B2-51-14895 | 5/1976 |
| JP | B2-54-30710 | 10/1979 |
| JP | A-57-53756 | 3/1982 |
| JP | A-57-167302 | 10/1982 |
| JP | B2-60-25045 | 6/1985 |
| JP | A-60-220358 | 11/1985 |
| JP | A-60-258203 | 12/1985 |
| JP | A-62-172006 | 7/1987 |
| JP | B2-36322 | 7/1988 |
| JP | B2-63-36321 | 7/1988 |
| JP | A-63-205665 | 8/1988 |
| JP | A-64-44456 | 2/1989 |
| JP | A-2-302761 | 12/1990 |
| JP | A-3-229268 | 10/1991 |
| JP | A-5-222109 | 8/1993 |
| JP | A-5-262809 | 10/1993 |
| JP | A-5-271312 | 10/1993 |
| JP | A-5-303231 | 11/1993 |
| JP | A-11-228850 | 8/1999 |
| JP | A-11-236559 | 8/1999 |

* cited by examiner

*Primary Examiner*—Tae H. Yoon
(74) *Attorney, Agent, or Firm*—Oliff & Berridge, PLC

(57) ABSTRACT

Polymeric particles of a desired particle size improved with the dispersion state of a pigment contained in the high polymeric particles can be obtained by a production method, which includes solution-polymerizing monomers having polymerizable unsaturated bonds in the presence of ionic particles sulfonic group or carboxyl group on the surface thereof.

17 Claims, No Drawings

POLYMERIC PARTICLES AND PRODUCTION METHOD THEREOF

BACKGROUND OF THE INVENTION

1. Field of the Invention

This invention concerns polymeric particles and a production method therefor. More in particular, it relates to polymeric particles which can be used, for example, for marking materials such as ink or toner, decorative materials used for interior or fashion articles use, various kinds of water absorbing materials including disposable diapers, various kinds of spacer materials applied to liquid crystal cells, chemical carriers used for medical use or immobilized enzyme carriers, column packing materials, and cosmetic fillers, as well as a production method therefor.

The polymeric particles obtained according to this invention can be used also as a material capable of controlling the volumic change reversibly in accordance with external stimulations. The material, when incorporated with a colorant, can be utilized for optical devices for controlling the transmission amount of light or sensors, display devices for the display of images and coloring material for recording use.

Further, this invention provides polymeric particles with a narrow particle size distribution and further concerns a process for efficiently producing such polymeric particles. Further, this invention concerns polymeric particles containing a pigment at a high density and in a favorably dispersed state.

2. Description of the Related Art

As a process for producing polymeric particles, a kneading/pulverization method and a polymerization method have been known generally.

The kneading/pulverization method has been utilized generally including a production method of toners used for the developer in electrophotography. Specifically, toners are produced, for example, by kneading under heating those ingredients such as a colorant necessary for the toner dispersed in a binder resin, cooling to solidify the kneading product, pulverizing the same and then classifying and collecting the pulverization product of an appropriate grain size.

On the other hand, various proposals have been made also for the production method of polymeric particles by the polymerization method. For example, various polymerization methods have been known including, for example, a dispersion polymerization method, a suspension (and reversed phase suspension) polymerization method, an emulsion polymerization method, a seed polymerization method and combination thereof. Production of the polymeric particles by the polymerization methods described above is advantageous since they can improve the problem during production of polymeric particles of a size smaller than 10 μm in the kneading/pulverization method described above, that is, the problem of increasing the pulverizing energy and requiring unnecessary cost in view of the difficulty for the classification.

Research and development have been made vigorously also for the production method of polymeric particles by the polymerization method regarding particles containing a colorant, for example, research and development regarding production of toners. For example, Japanese Published Examined Patent Application No. Sho 51-148995 and Japanese Published Unexamined Patent Application No. Sho 57-53756 disclose a production method for a toner by a suspension polymerization method, Japanese Published Unexamined Patent Application Nos. Sho 60-220358 and Sho 63-205665 disclose a production method for a toner by an emulsion polymerization method. Japanese Published Unexamined Patent Application No. Hei 3-229268 discloses a production method for a toner by a dispersion polymerization method. Japanese Published Unexamined Patent Application Nos. Sho 60-258203, Hei 5-222109, Hei 5-262809, Hei 5-271312 and Hei 5-303231, etc. disclose a production methods for a toner by a seed polymerization method, respectively.

Further, according to the contents of the disclosure described above, colorless or transparent polymeric particles can be obtained easily by not incorporating the colorant.

On the other hand, for polymeric particles not containing the colorant, a production method for water absorbing polymeric particles, for example, by a reversed phase suspension polymerization method has been well known and various proposals have been made. For example, production of water absorbing resin particles having a grain size of about 10 to 100 μm has been shown, for example, in Japanese Published Examined Patent Application No. Sho 54-30710 by using a sorbitan fatty acid ester having HLB of 3 to 6 as a dispersant, in Japanese Published Unexamined Patent Application No. Sho 57-167302 by using a nonionic surfactant having HLB of 6 to 9 as a dispersant, and in Japanese Published Examined Patent Application No. Sho 60-25045 by using a surfactant having HLB of 8 to 12 as a dispersant. In addition, Japanese Published Examined Patent Application No. Sho 63-36321 and Japanese Published Examined Patent Application No. Sho 63-36322 discloses that water absorbing resin particles having a grain size of about several hundred μm by using an oleophilic carboxyl group-containing polymer as a dispersant. Further, Japanese Unexamined Patent Application No. Sho 62-172006 discloses that polymeric particles of large particle size can be obtained by using a polyglycerin fatty acid ester having HLB from 2 to 16 as a dispersant.

However, any of the processes for producing polymeric particles by the various kinds of polymerization methods described above involves a problem that efficient production of particles of a narrow grain size distribution is generally difficult. Further, even when particles of a narrow grain size distribution can be obtained, this generally requires a great amount of dispersing medium and the production efficiency is extremely poor.

Further, in the case of the emulsion polymerization method or the seed polymerization method, the applicable grain size is 3 μm or smaller while the grain size distribution can be narrowed relatively. In the suspension polymerization method, since the grain size distribution cannot be narrowed, it is difficult in the application to the manufacture of polymeric particles at a grain size of from several μm to several tens μm which is necessary in the use of the particles as the display material.

In addition, there is also a problem that it is difficult to incorporate a colorant at a high density. For example, since it is difficult, in principle, to incorporate a colorant ingredient in the emulsion polymerization method and the dispersion polymerization method, it is generally required for an additional step of composing the polymeric particles after formation with the colorant ingredient as disclosed, for example, in Japanese Published Unexamined Patent Application Nos. Hei 1-44456, Hei 2-302761, and Hei 5-222109. However, this method involves a problem that the production step is complicated and the production cost is increased, as well as increase of content of the colorant is difficult.

On the other hand, the suspension polymerization method is, typically, a method of finely particulating liquid droplets of non-aqueous radial polymerizable monomers together with a suspension stabilizer in an aqueous medium by external mechanical shearing force and polymerizing the resultant monomer liquid droplets using an initiator to form solid particles. Since other ingredients than the monomer can easily be incorporated into the monomer liquid droplets by this method, colored particles can be prepared relatively easily. However, the monomer density in the dispersing medium has to be set to a relatively lower level, so that it requires a great amount of a dispersant. Accordingly, this requires considerable production cost and also results in a problem of poor production efficiency.

Further, use of a great amount of the dispersant is not preferred also in view of the reduction of environmental burdens and resource preservation. On the other hand, it may be considered to use a production facility capable of reutilizing the dispersant but this results in a problem of further increasing the production cost.

On the other hand, the present inventors, et al have made proposals regarding polymer gel particles incorporated with a pigment at a high density in Japanese Published Unexamined Patent Application No. Hei 11-228850 and Hei 11-236559. However, since the pigment contained at a high density is not uniformly dispersed in the polymeric particles prepared by a particulating polymerization method known so far such as the suspension polymerization method or the emulsion polymerization method, they involve a problem of poor uniformness of the density and colordeveloping property.

However, the inventors have found based on the succeeding study that the dispersed state of the contained pigment in the particles can be improved with respect to the improvement of the coloring property, reduction of the addition amount of the pigment and the improvement of the water absorbing property when the pigment is contained at a high density.

SUMMARY OF THE INVENTION

This invention has been accomplished as a result of an earnest study for overcoming the problems in the related art and improving the characteristics in the related art.

This invention intends to provide novel polymeric particles and a novel production method therefor.

The foregoing problems can be overcome in accordance with the following aspects <1> to <11> of the invention to be described below.

<1> A process for producing polymeric particles which includes solution polymerization of monomers having polymerizable unsaturated bonds in the presence of ionic particles, to obtain polymeric particles.

<2> In the aspect <1>, it is preferred that the ionic particles have group, on the surface thereof, derived from one or more of ionic functional groups selected from the group made up of carboxyl group, sulfonic group, phosphonic group, aminosulfonic group, as wells as ammonium group, quaternary ammonium group, and quaternary phosphonium group.

<3> It is preferred in the aspect <1> or <2> that the ionic particles are contained in the reaction solution at a ratio from 10 parts by weight to 900 parts by weight based on 100 parts by weight of the monomer having the polymerizable unsaturation bonds.

<4> It is preferred in the aspects <1> to <3> that the monomer having polymerizable unsaturation bonds are an ionic monomer.

<5> Polymeric particles obtained by solution polymerization of monomers having polymerizable unsaturation bonds in the presence of ionic particles.

<6> It is preferred in the aspect <5> that the ionic particles have group, on the surface thereof, derived from one or more of ionic functional groups selected from the group made up of carboxyl group, sulfonic group, phosphonic group, aminosulfonic group, as wells as ammonium group, quaternary ammonium group, and quaternary phosphonium group.

<7> It is preferred in the aspect <5> or <6> that the ionic particles are contained at a ratio from 10 parts by weight to 900 parts by weight based on 100 parts by weight of the monomer having the polymerizable unsaturation bonds.

<8> In the aspects <5> to <7>, it is preferred that the ionic particles are a pigment, the pigment is contained within a range from 5 parts by weight to 80 parts by weight based on 100 parts by weight of the resultant polymeric particles, and the average particle size of the pigment is 1 µm or smaller.

<9> It is preferred in the aspects <5> to <8> that the monomer having the polymerizable unsaturation bond is an ionic monomer.

<10> Polymeric particles obtained by solution polymerization of monomers having polymerizable unsaturation bonds in the presence of ionic particles, in which the ionic particles are a pigment, the pigment is contained within a range from 5 parts by weight to 80 parts by weight based on 100 parts by weight of the resultant polymeric particles, and the average particle size of the pigment is 1 µm or smaller.

<11> It is preferred in the aspect <10> that the monomer having the polymerizable unsaturation bond is an ionic monomer.

PREFERRED EMBODIMENT OF THE INVENTION

This invention is to be explained more in details.

In the process for producing the polymeric particles according to this invention, the polymeric particles can be obtained by solution polymerization of monomers having polymerizable unsaturated bonds in the presence of ionic particles.

According to the process for producing the polymeric particles of this invention, upon obtaining polymeric particles by using monomers and/or salt thereof having polymerizable unsaturation bonds, particles can be obtained by solution polymerization with no additional or intentional particulation such as suspension and/or emulsification required so far before polymerizing reaction. Further, since the grain size distribution of the obtained polymeric particles is extremely narrow, classification is scarcely required.

Further, in the process according to this invention, polymerizing reaction can be conducted in a monomer solution to which ionic particles are added, with no particular requirement of a dispersant and a dispersion stabilizer which are necessary in the suspension polymerization method or the emulsion polymerization method. Then, spherical polymeric particles are present after the reaction in the solution. In this case, when the polymeric particles are highly compatible with the solvent and are cross-linked, the polymeric particles are obtained in a swollen state. On the other hand, when the polymerizing reaction is conducted in a solvent with low compatibility to the polymeric particles, polymeric particles are obtained by deposition like that in the dispersion polymerization method. On the other hand, in this invention, polymeric particles can be prepared as a composition at an extremely small weight ratio between the monomer and the solvent in the reaction system (1:20 or less). This is greatly different from the so-called dispersion polymerization method conducted at a weight ratio of about 1:50.

Having the constitution as described above, this invention can provide a novel process for producing polymeric particles capable of efficiently obtaining polymeric particles at a desired grain size, as well as polymeric particles improved with the dispersion state of the material contained in the resultant polymeric particles, for example, a pigment.

The term "solution polymerization" used in this specification has a broad meaning of polymerization by using a solution.

"Solution polymerization" in the prior art is considered to correspond to the following (1) and (2).

(1) When a polymerizing reaction is conducted in a monomer solution at an appropriate density to form a reaction product having a compatibility with a solvent, an entirely integrated polymer is formed if the amount of solvent is small, whereas a polymer is obtained as a viscous solution if the amount of the solvent is larger.

(2) When the reaction product has no compatibility with the solvent, precipitation occurs as the reaction proceeds and integrated polymer is obtained if the amount of the solvent is small, whereas reaction corresponding to the so-called dispersion polymerization proceeds to obtain particles if the amount of the solvent is larger.

On the contrary, in this invention, particles can be obtained form a monomer solution at an extremely high density in the reaction system containing a desired amount of particles applied with an ionization treatment at the surface (that is, "ionic particles"), quite different from (1) and (2) above. Particularly, in a case of reactants with a cross-linking agent, particulated polymeric cross-linking product is obtained in a state of absorbing the solvent in a compatible solvent. This is considered to be attributable to the restriction on the growth of the molecular chain by the presence of the surface ionized particles in the radical polymerizing reaction induced from double bonds of the monomers having the polymerizable unsaturation bonds. Further, it is considered that substantially spherical particles are obtained because the reaction proceeding isotropically is restricted with respect to all the directions in the three dimension but detailed mechanism are unknown and are now under study. In this invention, when specified ionic particles are used, the same situations as described above can be observed without using the cross-linking agent described above since the ionic particles serve as the cross-linking agent.

The monomer having the polymerizable unsaturation bond used in this invention can include, mainly, those forming a water absorbing resin having water absorbability after polymerization, those usable in copolymerization therewith and resins constituting image forming materials used for toners or inks. When the obtained polymeric particles are used in, for example, light control and recording/display applications, those showing reversible volumic change by absorbing/releasing liquids, undergoing various stimulations such as pH change, change of ion density, absorption/desorption of chemical substances, change of solvent composition and provision of energy such as heat or electricity are preferred. The monomer providing such polymeric particles, particularly, water absorbing polymeric gels can include those monomers having polymerizable unsaturation bonds having functional groups derived from carboxylic acid and/or salts thereof, phosphoric acid and/or salts thereof, and sulfonic acid and/or salts thereof.

There can be mentioned, particularly, for example, (meth) acrylic acid or salts thereof; maleic acid or salts thereof; fumaric acid or salts thereof; itaconic acid salts thereof, crotonic acid or salts thereof; vinyl sulfonic acid or salts thereof; vinyl benzene sulfonic acid or salts thereof; acrylamide alkyl sulfonic acid or salts thereof such as 2-acrylamide-2-acrylamide-2-methyl propane sulfonic acid; and (meth)acryloyl alkyl sulfonic acid or salts thereof such as 2-acryloyl ethane sulfonic acid, 2-acryloyl propane sulfonic acid and 2-methacryloyl ethane sulfonic acid. One or more of them can be used.

As the salts of the monomers, alkali metal salts such as sodium or potassium or ammonium salts are preferred. In addition, various kinds of (meth)acrylic acid derivatives, for example, N-alkyl substituted (meth)acrylamide such as N-isopropyl(meth)acrylamide or N-propyl-(meth) acrylamide and N,N-dialkylamino alkyl(meth)acrylate and N-alkyl substituted alkyl(meth)acrylamide are also applicable. "(Meth)acryl" means both "acryl" and "methacryl".

Further, in this invention, the following compounds can be used alone or as a comonomer copolymerizable with the monomers described above. They can include, for example: (meth)alkyl acrylate esters such as (meth)acrylamide, 2-hydroxyethyl(meth)acrylamide, (poly)ethylene mono (meth)acrylate, 2-hydroxyethyl(meth)acrylate, methyl (meth)acrylate, ethyl(meth)acrylate, n-butyl(meth)acrylate, isobutyl (meth)acrylate, propyl(meth)acrylate, n-octyl (meth)acrylate, dodecyl(meth)acrylate, lauryl(meth) acrylate, 2-ethylhexyl (meth)acrylate, stearyl(meth)acrylate, 2-chloroethyl(meth)acrylate, phenyl(meth)acrylate, methyl α-chloroacrylate; acrylic acid or methacrylic acid derivatives such as acrylonitrile or methacrylonitrile; vinyl halides such as vinyl chloride, vinylidene chloride, vinyl bromide and vinyl fluoride; and N-vinyl compounds such as N-vinyl pyrrole, N-vinyl carbazole, n-vinyl indole and N-vinyl pyrrolidone.

Further, in the present invention, the following compounds can be used as the monomer in addition to the monomers described above, by which resins used for the image forming materials can also be obtained. Further, they can be used as the comonomer. There can be mentioned, for example: styrenes such as styrene, o-methyl styrene, m-methyl styrene, p-methyl styrene, α-methyl styrene, p-ethylstyrene, 2,4-dimethylstyrene, p-n-butyl styrene, p-tert-butyl styrene, p-n-hexyl styrene, p-n-octyl styrene, p-n-nonylstyrene, p-n-decylstyrene, p-n-dodecylstyrene, p-methoxy styrene, p-phenyl styrene, p-chloro styrene and 3,4-dichlorstyrene; ethylenically unsaturated monoolefins such as ethylene, propylene, butylene and isobutylene; vinyl ethers such as vinyl methyl ether, vinyl ethyl ether, vinyl isobutyl ether; and vinyl ketones such as vinyl methyl ketone, vinyl hexyl ketone, vinyl isopropenyl ketone; and vinyl naphthalenes.

The density of the monomer having the polymerizable unsaturation bond in the monomer solution is generally from 5% by weight to a saturation density and, preferably, from 10% by weight to 30% by weight.

In this invention, the monomer having the polymerizable unsaturation bond is preferably an ionic monomer.

The term "ionic monomer" is used for collectively meaning monomers having the ionic functional groups in the molecular structure. The ionic functional group is a functional group capable of ionizing mainly in an aqueous solution to form a cation or an anion and includes, particularly, carboxyl group, sulfonyl group, phosphonic group, quaternary ammonium group and quaternary phosphonium group, as well as those groups described from such functional groups such as of alkali metal salts and halogen salts thereof, with no particular restriction only thereto.

Examples of the ionic monomers having the ionic functional groups describe above can include particularly, for example, (meth)acrylic acid or salts thereof; maleic acid or salts thereof, fumaric acid or salts thereof, itaconic acid or salts thereof; crotonic acid or salts thereof; vinyl sulfonic acid or salts thereof; vinyl benzene sulfonic acid or salts thereof; acrylamine alkyl sulfonic acids such as 2-acrylamide-2-methylpropane sulfonic acid or salts thereof; and (meth)acryloylalkylsulfonic acid such as 2-acryloylethane sulfonic acid, 2-acryloylpropane sulfonic acid, 2-methachloylethane sulfonic acid or salts thereof.

In this invention, solution polymerization is conducted under the presence of ionic particles. The ionic particles usable herein can include those formed by applying an ionization treatment to the surface of resin particles, inorganic particles and various known pigments. The ionization treatment to the surface of the particles is preferably conducted so as to provide the surface thereof with a group derived from one or more ionic functional groups selected from the group mainly having carboxyl group, sulfonic group, phosphonic group, and aminosulfonic group, as well as ammonium group and quaternary ammonium group quaternary phosphonium group. Further, the groups derived from the functional groups described above may be bonded directly to the surface of the particles or by way of alkylene chain or phenyl chain or hydroxyphenylene chain as a spacer molecular chain. In addition, ionization treatment may be applied to the surface after applying a surface modification with various kinds of ionic graft chains including (meth) acrylic acid polymer, or after applying coating with a polymer by microencapsulation treatment.

The term "group derived from the ionic functional group" used in this specification means those groups containing —COOH group and —COO⁻ group referring, for example, to the carboxyl group. Accordingly, referring, for example, to the carboxyl group, the group derived from the ionic functional group can include, for example, a salt of —COO⁻ group and a pair ion, and —COOH group. The ionic particles are preferably ionized, for example, as —COO⁻ in the solution during production method for the polymeric particles.

Appropriate inorganic particles used as the ionic particles can include inorganic materials, for example: inorganic oxides such as zinc oxide, basic lead carbonate, basic lead sulfate, lead sulfate, lithopone, white mica, zinc sulfide, titanium oxide, antimony oxide, white lead, zirconium oxide, alumina, Micanite, MICAREX, quartz, calcium carbonate, gypsum, clay, silica, silisic acid, diatomaceous earth, talc, basic magnesium carbonate, alumina white, gloss white and satin white; metal materials such as zinc, alumel, antimony, aluminum, aluminum alloy, iridium, indium, osmium, chromium, Chromel, cobalt, zirconium, stainless steel, gold, silver, nickel silver, copper, bronze, tin, tungsten, tungsten steel, iron, lead, nickel, nickel alloy, nickeline, platinum, platinum/rhodium , tantalum, duralumin, dichromate, titanium, Krupp/austenite steel, constantan, brass, platinum/iridium, palladium, palladium alloy, molybdenum, molybdenum steel, manganese, manganese alloy, rhodium, rhodium/gold; and inorganic materials such as ITO (indium/tin oxide).

Specific examples of the materials constituting the appropriate organic particles used for the ionic particles can include those polymeric materials such as phenol resin, furan resin, xylene/formaldehyde resin, urea resin, melamine resin, aniline resin, alkyd resin, unsaturated polyester, epoxy resin, polyethylene, polypropylene, polystyrene, poly-p-xylylene, polyvinyl acetate, acryl resin, methacryl resin, polyvinyl chloride, polyvinylidene chloride, fluoro-type plastic, polyacrylonitrile, polyvinyl ether, polyvinylketone, polyether, polycarbonate, thermoplastic polyester, polyamide, diene type plastic, polyurethane type plastic, polyphenylene, polyphenylene oxide, polysulfone, aromatic heterocyclic polymer, silicone, natural rubber type plastics, cellulose type plastic, as well as mixed materials of two or more of such polymeric materials (polymer blend).

There is no particular restriction on the form of the ionic particles used in the present invention. Various particles, for example, of granular, block, film, amorphous or fiber forms can be used. When the ionic particles per se are utilized as the colorant, it is particularly preferred to use the ionic particles in the granular form since they have a feature, for example, of high color-developing property. There is no particular restriction on the configuration of the particular form, either and those of spherical, cubic, ellipsoidal, polyhedral, porous, star-like, acicular, hollow or flaky shape can be applied.

A pigment can be used as the ionic particles in this invention. When a pigment applied with an ionization treatment on the surface is used as the ionic particles, the pigment is dispersed extremely favorably in the resultant polymeric particles and the pigment can be incorporated at a high density. Further, the thus obtained polymeric particles can be formed as water absorbing polymeric particles. It is considered that the pigment can be incorporated into the polymeric particles with a good dispersibility and at a high density because a surfactant or a dispersant used in the granulation polymerization method of the prior art is not used at all in this invention so that a high dispersion state of the pigment in the mixed solution before reaction can be maintained also in the resultant polymeric particles.

Pigments usable appropriately as the ionic particles can include, for example, various kinds of carbon black (channel black, furnace black, etc.) as black pigment, nigrosine series compounds as black dye, as well as color pigment, for example, benzidine series yellow pigment, quinacridone series, rhodamin series magenta pigment and phthalocyanine series pigment.

More particularly, as a yellow pigment, compounds typically represented by condensed azo compounds, isoindolinone compounds, anthraquinone compounds, azo metal complexes, methine compounds and arylamide compounds are used. Specifically, pigment yellow 12, 13, 14, 15, 17, 62, 74, 83, 93, 94, 95, 109, 110, 111, 128, 129, 147 and 168, etc. can be used preferably, for example, as the dye described above.

Further as a magenta pigment, condensed azo compounds, diketopyrrolopyrrole compounds, anthraquionone, quinacridone compounds, basic dye lake compounds, naphthol compounds, benzimidazolone compounds, thioindigo compounds, perylene compounds may be used. Specifically, as the pigment described above C.I. pigment red 2, 3, 5, 6, 7, 23, 48; 2, 48; 3, 48; 4, 57; 1, 81; 1, 144, 146, 166, 169, 177, 184, 185, 202, 206, 220, 221 and 254 are particularly preferred.

Further, copper phthalocyanine compounds and derivative thereof, anthraquinone compounds can be used as the cyan pigment. Specifically, C.I. pigment blue 1, 7, 15, 15: 1, 15: 2, 15, 3, 15; 4, 60, 62 and 66 can be used particularly preferably as the pigment described above.

These pigments can be used alone, or optionally in admixture.

For practicing this invention, the most effective ionic particles are carbon black applied with an ionization treatment on the surface with sulfonic groups or carboxyl groups and can include, particularly, CAB-O-JET™200 and CAB-O-JET™300 manufactured by Cabot Inc.

The ionic particles are mixed effectively by from 10 parts by weight to 900 parts by weight, preferably, from 25 to 400 parts by weight, more preferably, from 40 to 200 parts by weight based on 100 parts by weight of monomers having polymerizable unsaturation bonds in the reaction solution. When the addition amount is too small, the entire products tend to be integrated and are not formed into particles depending on the compositional ratio of other ingredients. On the other hand, when the addition amount is too large, the polymer per se do not tend to be obtained since the amount of the monomer ingredient is too small.

The amount of ionic particles, particularly, of the pigment in the obtained polymeric particles depends on the system to which the obtained polymeric particles are applied, but the amount of ionic particles, particularly, of the pigment is from 5 to 80 parts by weight, preferably, from 10 to 70 parts by weight and more preferably, from 20 to 60 parts by weight in 100 parts by weight of the polymeric particles.

Further, when the pigment applied with the ionization treatment is contained as the ionic particles in the polymeric particles, the average grain size of the pigment is preferably 1 μm or smaller. This is because it functions advantageously for the improvement the color-developing property of particles, the reduction of the density of the contained pigment and the easier control of the absorbability when using the obtained polymeric particles as color-developing particles. Namely, when the average grain size of the pigment is too large, because the pigments are coagulated or the grain size of the primary particles is large, the color-developing property of the pigment particles is poor, and the amount of the pigments required for obtaining predetermined color-developing property is increased, to result in increase of the production cost. When the density of the pigment is too high, this results in a problem of narrowing the control region of the absorbability of the particles when the polymeric particles to be obtained are water absorbing gel particles. It is not necessary to determine a lower limit for the average grain size in view of the polymerization reaction, but the average grain size is preferably 0.01 μm or larger for colored polymeric particles. This is because the color-developing effect tends to be lowered, as well as the pigment tends to leak from the inside to the outer of the polymeric particles when the average grain size is too small.

Cross-linking agents and additives can optionally be added in the production method of the polymeric particles and the polymeric particles of this invention for improving physical characteristics such as strength and chargeability of particles and improvement of characteristics as the water absorbing resin.

The cross-linking agent can include, for example, compounds having two or more polymerizable unsaturated groups and reactive functional groups in the molecule.

The compound having two or more polymerizable unsaturation groups can include, for example, di- or tri(meth) acrylates of polyols such as ethylene glycol, propylene glycol, trimethylol propane, glycerin polyoxyethylene glycol, polyoxypropylene glycol, polyglycerin; unsaturated polyesters obtained by reacting the polyols and unsaturated acids such as maleic acid and fumaric acid; bis(meth) acrylamides such as N-N'-methylene bis(meth)acrylamide; acid di(meth)acrylate carbamate ester obtained by reacting polyisocyanate such as tolylene isocyanate, hexamethylene diisocyanate with hydroxyethyl (meth)acrylate; polyvalent allyl series compounds such as allylated starch, allylated cellulose, diallylphthalate, other tetraaryloxyethane, pentane erythritol triallyl ether, trimethylol propane triallyl ether, diethylene glycol dially ether and trially trimethyl ether.

Among them, ethylene glycol di(meth)acrylate, propylene glycol di(meth)acrylate, polyethylene glycol di(meth) acrylate, polypropylene glycol di(meth)acrylate, N,N'-methylene bis(meth)acrylamide are used preferably in this invention.

The compound having two or more reactive functional groups can include, for example, diglycidyl ether compounds, haloepoxy compounds, di- and triisocyanate compounds. Specific examples of the diglycidyl ether compound can include ethylene glycol diglycidyl ether, polyethylene glycol diglycidyl ether, propylene glycol diglycidyl ether, polypropylene glycol diglycidyl ether, glycerin diglycidyl ether, polyglycerin diglycidyl ether. In addition, specific examples of the haloepoxy compounds can include epichlorohydrin, epibromohydrin, and β-methylepichlorohydrin. Further, specific examples of the diisocyanate compounds can include 2,4-tolylene diisocyanate and hexamethylene diisocyanate.

Among them, ethylene glycol diglycidyl ether, hexamethylene diisocyanate and the like are preferably used in this invention.

Among all, N,N-methylene bis(meth)acrylamide is particularly preferred.

The amount of the cross-linking agent used is generally from 0.001 to 10 parts by weight, preferably, from 0.01 to 5 parts by weight based on 100 parts by weight of the monomer charged. In addition, an inert inorganic powder such as finely particulate silica, titanium dioxide powder and alumina powder can optionally be used as an additive in an appropriate amount depending on a desired purpose.

In the present invention, when specific ionic particles are used, a cross-linked polymer material can be used without using any cross-linking agent. The reason is considered that specific ionic particles having the surface treated function as the cross-linking agent.

Any polymerization initiator can be used in this invention so long as the initiator can be dissolved in an aqueous solution of monomers having the polymerizable unsaturation bonds. Specifically, persulfate such as potassium persulfate, sodium persulfate and ammonium persulfate; peroxides such as hydrogen peroxide, t-butyl hydroperoxide and cumene hydroperoxide; azo compounds such as azoisobutylonitrile, 2,2'-azobis(2-amidinopropane) dihydrogenchloride can be used.

Among the polymerization initiators, initiators showing oxidizing property such as persulfates and hydroperoxides can be used as redox initiators in combination with reducing agent such as sodium hydrogensulfite, L-ascorbic acid and ferrous salts or amines such as N,N,N',N'-tetramethylethylene diamine.

The amount of the initiators used, while depending on the density of the monomer solution, is generally from 0.001 to 10% by weight, preferably, from 0.05 to 5 parts by weight based on 100 parts by weight of the monomer having polymeric unsaturation bonds.

The process for producing polymeric particles of this invention will be explained more particularly.

The polymerization operation of this invention includes at first forming the monomers having polymerizable unsaturation bonds as an aqueous solution preferably and conducting solution-polymerization of the aqueous solution of the monomers by using a water soluble radical initiator optionally in the presence of a cross-linking agent.

The aqueous solution may contain a compound which makes the solution basic. The function of such compound has not yet been apparent, but it is considered that the compound has a function of ionizing or promoting ionization of ionic functional groups present in the aqueous solution and also ionizing or promoting ionization of ionic functional groups on the surface of ionic particles, or alkoxidizing hydroxy groups when they are present on the surface of the ionic particles.

Specific example of such compounds can include potassium hydroxide and sodium hydroxide. Potassium hydroxide is preferably used as such a compound in the system of this invention where ionic particles have sulfonic or carboxyl groups on the surface.

When radicals are formed by heating, the reaction temperature may be within a range of from 30 to 200° C., preferably, from 50 to 100° C. Although the reaction is retarded when temperature is too low, the effect of improving the reaction rate is small by unnecessary rise of the temperature, which is uneconomical. Room temperature may suffice in a case of conducting redox reaction by adding a reducing material.

The reaction time is about from 0.1 to 72 hours, and longer time can provide higher conversion rate. However, as the reaction proceeds, the reaction rate is lowered and the increase of the conversion rate is also reduced. Accordingly, in the heating reaction, it is preferably from 2 to 20 hours and, when conducting redox reaction, it is about from 0.5 to 10 hours.

After the completion of the reaction, the temperature is lowered again to a room temperature, and the aimed polymeric particles may be taken out as they are and dried. When the polymeric particles are swollen by a solvent, the particles tend to coagulate when they are dried as they are. Accordingly, after the completion of the reaction, they may preferably be dried after appropriate solvent-removing operation. In addition, the solvent-removal can be applied by a method of repeating washing by using a solvent compatible with a swelling solvent not absorbed to the polymeric particles and removing the solvent in the polymeric particles.

EXAMPLE

This invention is to be explained more particularly with reference to examples but the invention is not restricted only to such examples.

Example 1

6.528 parts by weight of an aqueous 20% dispersion of carbon black rendered hydrophilic at the surface with sulfonic groups (CAB-O-JET™200: manufactured by Cabot Inc.) as ionic particles, 1.096 parts by weight of potassium hydroxide, 1.000 parts by weight of acrylic acid and 0.002 parts by weight of N,N'-methylene bisacrylamide as a cross-linking agent were added to a reaction vessel made of glass and dissolved and mixed thoroughly.

Nitrogen gas was brown into the mixed solution for 10 min and dissolved oxygen was substituted with nitrogen. Subsequently, an aqueous solution formed by dissolving 0.045 parts by weight of ammonium persulfate into 0.445 parts by weight of distilled water as a reaction initiator was added and mixed thoroughly such that the reaction initiator was homogeneous. Then, the reaction vessel was sealed and stood still in a water bath at 70° C. for three hours to conduct polymerizing reaction.

After the reaction, when the specimen in the vessel was taken out and observed under an optical microscope, it was confirmed that black spherical particles were obtained, with an average grain size after drying of 8 $\mu$m and at an extremely narrow grain size distribution in which particles ranging from 5 to 10 $\mu$m were present for 89% in the entire portion. It was confirmed that the particles were such highly water absorbing particles that the particle diameter of which was swollen by about five times (about 120 times as the volume change) when kept in a weakly alkaline water at about pH 9.

When the pigment contained in the spherical particles was observed under an optical microscope, the dispersion state was satisfactory and the average grain size of the pigment particles was 1 $\mu$m or smaller.

Example 2

6.528 parts by weight of an aqueous 20% dispersion of carbon black rendered hydrophilic at the surface with sulfonic group (CAB-O-JET™200: manufactured by Cabot Inc.) as ionic particles, 1.096 parts by weight of potassium hydroxide, 1.000 parts by weight of acrylic acid and 0.005 parts by weight of N,N'-methylene bisacrylamide as a cross-linking agent were added to a reaction vessel made of glass and dissolved and mixed thoroughly.

Nitrogen gas was brown into the mixed solution for 10 min and dissolved oxygen was substituted with nitrogen. Subsequently, an aqueous solution formed by dissolving 0.045 parts by weight of ammonium persulfate into 0.445 parts by weight of distilled water as a reaction initiator was added and mixed thoroughly such that the reaction initiator was homogeneous. Then, the reaction vessel was sealed and stood still in a water bath at 70° C. for three hours to conduct polymerizing reaction.

After the reaction, when the specimen in the vessel was taken out and observed under an optical microscope, it was confirmed that black spherical particles were obtained, with an average grain size after drying of 8 $\mu$m and at an extremely narrow grain size distribution in which particles ranging from 5 to 10 $\mu$m were present for 89% in the entire portion. When the pigment contained in the spherical particles was observed under an optical microscope, the dispersion state was satisfactory and the average grain size of the pigment particles was 1 $\mu$m or smaller.

It was confirmed that the grain size of the particles was swollen by about twice when the particles were kept at weakly alkaline water of about pH of 9, and the grain size was shrunk to about one-half when the particles were kept in a strongly acidic water of about pH 2, and it was confirmed that particles changing their volume by the pH change could be obtained. In addition, it was also confirmed that the pH dependent volumic change can be conducted repeatedly and reversibly.

Example 3

4.710 parts by weight of an aqueous 15% dispersion of carbon black ionized at the surface (CAB-O-JET™200: manufactured by Cabot Inc.) as ionic particles, 1.030 parts by weight of potassium hydroxide, 1.000 parts by weight of acrylic acid and 0.005 parts by weight of N,N'-methylene bisacrylamide as a cross-linking agent were added to a reaction vessel made of glass and dissolved and mixed thoroughly.

Nitrogen gas was brown into the mixed solution for 10 minutes and dissolved oxygen was substituted with nitrogen. Subsequently, an aqueous solution formed by dissolving 0.045 parts by weight of ammonium persulfate into 0.500 parts by weight of distilled water as a reaction initiator was added and mixed thoroughly such that the reaction initiator was homogeneous. An aqueous solution prepared by dissolving 0.144 g of N,N,N',N'-etramethylethylene diamine in 0.500 parts by weight of distilled water was added as a reducing agent and mixed homogeneously. Then, the reaction vessel was sealed and stood still for one hour to conduct polymerizing reaction.

After the reaction, when the specimen in the vessel was taken out and observed under an optical microscope, it was confirmed that black spherical particles were obtained, with an average grain size after drying of 7 µm and at an extremely narrow grain size distribution in which particles ranging from 5 to 10 µm were present for 85% in the entire portion. When the pigment contained in the spherical particles was observed under an optical microscope, the dispersion state was satisfactory and the average grain size of the pigment particles was 1 µm or smaller.

It was confirmed that the grain size of the particles was swollen by about twice when the particles were kept at weakly alkaline water of about pH of 9, and the grain size was shrunk to about one-half when the particles were kept in a strongly acidic water of about pH 2, and it was confirmed that particles changing their volume by the pH change could be obtained. In addition, it was also confirmed that the pH dependent volumic change can be conducted repeatedly and reversibly.

Example 4

Polymerization reaction was conducted by the same manner as in Example 1 except for using acrylamide by 0.986 parts by weight.

After the reaction, when the specimen in the vessel was taken out and observed under an optical microscope, it was confirmed that black spherical particles were obtained with an average grain size after drying of 8 µm and at an extremely narrow grain size distribution in which particles ranging from 5 to 10 µm were present for 90% in the entire portion. When the pigment contained in the spherical particles was observed under an optical microscope, the dispersion state was satisfactory and the average grain size of the pigment particles was 1 µm or smaller.

It was also confirmed that the volume of the particles changed by about three times when they were kept in distilled water of about pH 7 and in acetone, and particles changing the volume by the change of the solvent composition could be obtained. In addition, it was also confirmed that the change of the volume corresponding to the solvent composition could be conducted repeatedly and reversibly.

Example 5

Polymerization reaction was conducted by the same manner as in Example 1 except for using N-isopropylacrylamide by 1.570 parts by weight as a main monomer.

After the reaction, when the specimen in the vessel was taken out and observed under an optical microscope, it was confirmed that black spherical particles were obtained, with an average grain size after drying of 24 µm and at an extremely narrow grain size distribution in which particles ranging from 20 to 30 µm were present for 78% in the entire portion. When the pigment contained in the spherical particles was observed under an optical microscope, the dispersion state was satisfactory and the average grain size of the pigment particles was 1 µm or smaller.

It was confirmed that the volume of the particles changed by about four times by the change of temperature of from 10° C. to 70° C., and also confirmed that particles changing their volume depending on the temperature change could be obtained. In addition, it was also confirmed that the heat sensitive volumic change could be obtained repeatedly and reversibly.

Comparative Example 1

Polymerization reaction was conducted by the same manner as in Example 1 except for using an aqueous dispersion of a carbon black (hereinafter referred to as CB) having a surface with no ionization treatment. The CB liquid dispersion was prepared by mixing 14.30 parts by weight of Show black N 762 (manufactured by SHOWA CABOT K.K.), 57.20 parts by weight of distilled water and 0.76 parts by weight of an Emulgen 909 (manufactured by Kao Corp.) as a dispersing agent under stirring by a planetary mil for one hour.

After the reaction, the specimen in the vessel was an entirely integrated bulky black gel, and no particulate gel was obtained. Accordingly, it was confirmed that polymeric gel particles could be obtained by solution polymerization by using particles ionized at the surface.

Comparative Example 2

Colored particles were prepared by a reversed phase suspension polymerization method as described below by using an aqueous dispersion of the carbon black (hereinafter referred to as CB) prepared in Comparative Example 1.

At first, 6.528 parts by weight of an aqueous dispersion of a carbon black prepared in Comparative Example 1, 1.096 parts by weight of potassium hydroxide, 1.000 parts by weight of acrylic acid and 0.002 parts by weight of N,N'-methylene bisacrylamide as a cross-linking agent were added in a 200-ml-volume Teflon cup and dissolved and mixed thoroughly.

Nitrogen gas was brown into the mixed solution for 10 minutes and dissolved oxygen was substituted with nitrogen. Subsequently, an aqueous solution formed by dissolving 0.045 parts by weight of ammonium persulfate into 0.045 parts by weight of distilled water as a reaction initiator was added and mixed thoroughly such that the reaction initiator was homogeneous.

Subsequently, previously prepared pigment dispersed monomer solution, a cyclohexane solution separately prepared as a dispersing stabilizer, namely, 0.5 g of sorbitan monostearate having HLB of 4.7 (manufactured by Dai-ichi Kogyo Seiyaku Co., Ltd.) dissolved in 300 ml of cyclohexane were charged in a 300-ml-volume separable flask equipped with a stirrer, a reflux cooler and an introduction tube. Then, it was stirred and suspended by using a propeller-type blade of three vanes at 600 rpm at a room temperature and then the stirring rate was increased to 300 rpm, heated in a water bath at 70° C. so as to react for six hours to obtain colored polymeric gel particles.

When the pigment contained in the obtained particles was observed, it was confirmed that the average grain size of the pigment particles was 1 µm or larger and the particles were poor in the dispersion state, and contained a number of pigment agglomerates. Further, this was colored particles having many transparent regions locally where no pigments were present and showed an uneven state for color-development. Accordingly, it was confirmed that the average grain size of the pigments had to be 1 μm or smaller for obtaining good color-developing property, and the production method of high molecular particles of this invention was effective.

This invention provides new polymeric particles and a new production method thereof.

The entire disclosure of Japanese Patent Application No. 2000-009497 filed on Jan. 18, 2000 including specification, claims, drawings and abstract is incorporated herein by reference in its entirety.

What is claimed is:

1. A process for producing polymeric particles which comprises solution polymerization of monomers having polymerizable unsaturated bonds in the presence of ionic particles to obtain polymeric particles, wherein said ionic particles are particles selected from the group consisting of resin particles, inorganic particles, and pigments, which have been subjected to an ionization treatment to the surface of said particles.

2. A production method for polymeric particles according to claim 1, wherein the surface of the ionic particles has groups, provided by the ionization treatment, derived from one or more of ionic functional groups selected from the group consisting of carboxyl group, sulfonic group, phosphonic group, aminosulfonic group, ammonium group, quaternary ammonium group, and quaternary phosphonium group.

3. A production method for polymeric particles according to claim 1, wherein the ionic particles are contained in the reaction solution at a ratio from 10 parts by weight to 900 parts by weight based on 100 parts by weight of the monomer having the polymerizable unsaturation bonds.

4. Polymeric particles obtained by solution polymerization of monomers having polymerizable unsaturation bonds in the presence of ionic particles, wherein said ionic particles are particles selected from the group consisting of resin particles, inorganic particles, and pigments, which have been subjected to an ionization treatment to the surface of said particles.

5. Polymeric particles according to claim 4, wherein the surface of the ionic particles has groups, provided by the ionization treatment, derived from one or more of ionic functional groups selected from the group consisting of carboxyl group, sulfonic group, phosphonic group, aminosulfonic group, ammonium group, quaternary ammonium group, and quaternary phosphonium group.

6. Polymeric particles according to claim 4, wherein the ionic particles are contained at a ratio from 10 parts by weight to 900 parts by weight based on 100 parts by weight of the monomer having the polymerizable unsaturation bonds.

7. Polymeric particles according to claim 4, wherein the ionic particles are a pigment, the pigment is contained within a range from 5 parts by weight to 80 parts by weight based on 100 parts by weight of the resultant polymeric particles, and the average particle size of the pigment is 1 μm or smaller.

8. Polymeric particles obtained by solution polymerization of monomers having polymerizable unsaturation bonds in the presence of ionic particles formed by applying an ionization treatment to the surface of a pigment, and the pigment is contained with a range from 5 parts by weight to 80 parts by weight based on 100 parts by weight of the resultant polymeric particles, and the average particle size of the pigment is 1 μm or smaller.

9. Polymeric particle according to claim 8, wherein the monomer having the polymerizable unsaturation bond is an ionic monomer.

10. A production method for polymeric particles according to claim 2, wherein the groups derived from the ionic functional groups are bonded directly to the surface of the ionic particles.

11. A production method for polymeric particles according to claim 1, wherein the ionization treatment is applied after applying a surface modification to the resin particles, inorganic particles or pigments with at least one ionic graft chain.

12. A production method for polymeric particles according to claim 11, wherein the ionic graft chain is a (meth) acrylic acid polymer.

13. A production method for polymeric particles according to claim 1, wherein ionization treatment is applied after applying a coating to the resin particles, inorganic particles or pigments with a polymer by microcapsulation treatment.

14. Polymeric particles according to claim 5, wherein the groups derived from the ionic functional groups are bonded directly to the surface of the ionic particles.

15. Polymeric particles according to claim 4, wherein the surface of the resin particles, inorganic particles or pigments is modified with at least one ionic graft chain prior to ionization treatment.

16. Polymeric particles according to claim 15, wherein the ionic graft chain is a (meth)acrylic acid polymer.

17. Polymeric particles according to claim 4, wherein the ionic particles have a polymer coating, created by microcapsulization treatment, prior to ionization treatment.

* * * * *